United States Patent
Shiba et al.

(10) Patent No.: US 7,752,573 B2
(45) Date of Patent: Jul. 6, 2010

(54) DISPLAY CONTROLLER, DISPLAY CONTROL METHOD, MOBILE TERMINAL DEVICE, AND DISPLAY CONTROL PROGRAM

(75) Inventors: Yutaka Shiba, Tokyo (JP); Bodil Veige, Molle (SE)

(73) Assignee: Sony Ericsson Mobile Communications AB, Lund (SE)

( * ) Notice: Subject to any disclaimer, the term of this patent is extended or adjusted under 35 U.S.C. 154(b) by 340 days.

(21) Appl. No.: 11/403,953

(22) Filed: Apr. 14, 2006

(65) Prior Publication Data

US 2006/0250419 A1 Nov. 9, 2006

(30) Foreign Application Priority Data

Apr. 25, 2005 (JP) .............................. 2005-126568

(51) Int. Cl.
*G06F 3/048* (2006.01)
*G06F 3/00* (2006.01)
(52) U.S. Cl. ..................... 715/835; 715/721; 715/854; 707/E17.209
(58) Field of Classification Search ................. 715/835, 715/722, 721, 764, 810, 838, 854, 963; 707/E17.209
See application file for complete search history.

(56) References Cited

U.S. PATENT DOCUMENTS

| | | | |
|---|---|---|---|
| 6,486,895 B1 * | 11/2002 | Robertson et al. .......... 715/776 |
| 6,493,006 B1 * | 12/2002 | Gourdol et al. ............. 715/825 |
| 6,545,687 B2 * | 4/2003 | Scott et al. .................. 345/629 |
| 6,570,582 B1 * | 5/2003 | Sciammarella et al. ...... 345/660 |
| 6,667,751 B1 * | 12/2003 | Wynn et al. ................. 715/833 |
| 6,990,637 B2 * | 1/2006 | Anthony et al. ............. 715/851 |
| 7,325,198 B2 * | 1/2008 | Adcock et al. .............. 715/722 |
| 7,448,001 B2 * | 11/2008 | Miyazaki et al. ............ 715/853 |
| 2005/0091596 A1 * | 4/2005 | Anthony et al. ............. 715/712 |
| 2005/0289482 A1 * | 12/2005 | Anthony et al. ............. 715/851 |

FOREIGN PATENT DOCUMENTS

| | | |
|---|---|---|
| JP | 11-85450 | 3/1999 |
| JP | 2003-271665 | 9/2003 |
| JP | 2004-297649 | 10/2004 |
| JP | 2005-31830 | 2/2005 |

* cited by examiner

*Primary Examiner*—William L Bashore
*Assistant Examiner*—Andrew Tank
(74) *Attorney, Agent, or Firm*—Oblon, Spivak, McClelland, Maier & Neustadt, L.L.P.

(57) ABSTRACT

Disclosed is a display controller having: time line display means that includes at least two or more units of time on, of a first display area and a second display area that are formed on display means, the first display area, and that displays a time line manipulable to specify a desired unit of time from the two or more units of time; and related information display means that reads out, from a plurality of pieces of information stored respectively including time information added, information to which are added time information related to a unit of time specified by manipulation of the time line displayed on the first display area through operating means, and that displays the read out information on the second display area of the display means.

13 Claims, 6 Drawing Sheets

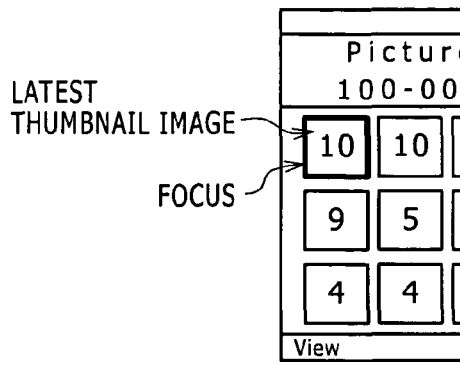
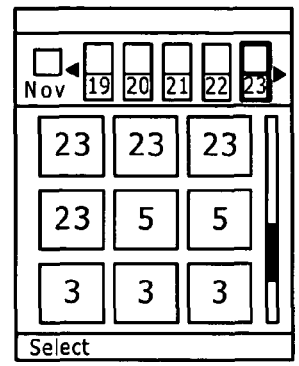
FIG.3A     FIG.3D
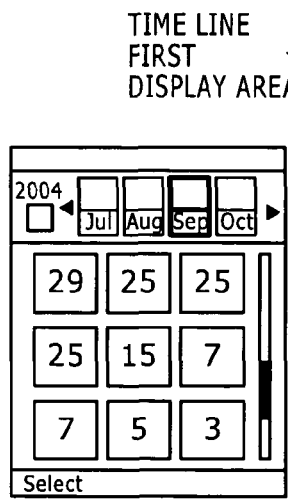
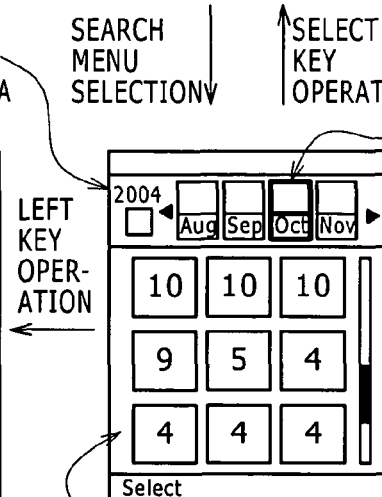
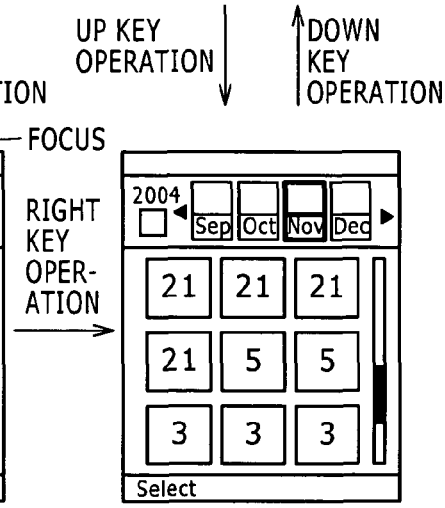
FIG.3C     FIG.3B     FIG.3E
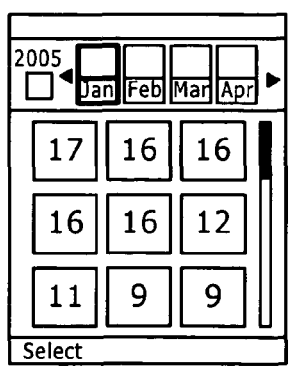
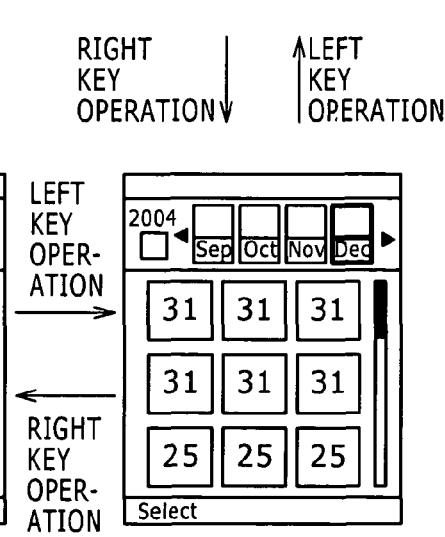
FIG.3G     FIG.3F

DISPLAY CONTROLLER, DISPLAY CONTROL METHOD, MOBILE TERMINAL DEVICE, AND DISPLAY CONTROL PROGRAM

CROSS REFERENCES TO RELATED APPLICATIONS

The present invention contains subject matter related to Japanese Patent Application No. 2005-126568 filed in the Japanese Patent Office on Apr. 25, 2005, the entire contents of which being incorporated herein by reference.

BACKGROUND OF THE INVENTION

1. Field of the Invention

The present invention relates to a display controller, a display control method, a mobile terminal, and a display control program that are well suited for use with terminals, such as mobile phones, PHS (personal handyphone system) phones, PDAs (personal digital assistant), and notebook or desktop personal computers. More specifically, the invention relates to a display controller, a display control method, a mobile terminal, and a display control program easily enabling browsing (including verification (reading)) of a large amount of data stored in a storage medium.

2. Description of the Related Art

In today's pervasive mobile phones, many functions, such as a telephone function, a mobile mail function, a web browsing function, a camera function, a music player function, and a television broadcast receiving function. In addition, with such increased functions, memory with a large storage capacity is required, and hence an internal memory with a large storage capacity is provided. Further, a mass storage memory (external memory) attachable and detachable to and from the apparatus body is attachable, whereby the mobile phone has as a whole a large storage capacity as the sum of the respective storage capacities of the internal memory and the external memory.

As a result, a large amount of data can be stored in the mobile phone (the internal memory and the external memory), and a user stores data of, for example, a telephone directory, a schedule book; still images and motion images captured by using the camera function; and music data to be played back by using the music player function.

Before being played back, respective data are list displayed; and in the case of still images, either only a plurality of thumbnail images or the plurality of thumbnail images with their captured dates are parallel arranged and displayed. In addition, in the case of motion images, icons of motion images indicating that data stored in the memory are represent motion images and their captured dates are parallel arranged and displayed. For music data, melody titles of the respective music data, album titles therefor, and so forth are parallel arranged and displayed.

For displaying a desired still image, a user recognizes the desired still image in accordance with a corresponding thumbnail image, captured date, and the like, and specifies displaying of that still image. Thereby, the still image specified by the user is largely displayed on a display portion of the mobile phone. For playing back a desired motion image, the user of a desired still image, a user recognizes the desired still image in accordance with a corresponding thumbnail image, captured date, and the like, and specifies playback of that still image. Thereby, the motion image specified by the user is displayed in the form of a large screen on the display portion of the mobile phone. For playing back desired music data, the user recognizes the desired music data in accordance with a corresponding melody title, album title, and the like, and specifies playback of the music data. Thereby, a playback output of the music data specified by the user is obtained through, for example, a speaker unit or an earphone unit connected to an earphone terminal thereof.

Also known are mobile phones of the type that allows addition of meta-information to respective pieces of data, thereby to enable quick searching for desired data from among a large amount of data. When using a mobile phone of this type, a user operates the phone to display an edit screen of the property of desired data, and inputs a desired title and the like thereon. For instance, in the case of the data representing a still image of an athletic meeting, user inputs a title, such as "athletic meeting." Thereby, the contents of the data can be generously recognized in accordance with the input title, and retrieval of desired data can be facilitated.

In addition, in Japanese Unexamined Patent Application Publication No. 2004-297649 (pp. 7 to 10; FIGS. 6, 8, and 10), a video signal recording and/or playback apparatus is disclosed that facilitates retrieval of desired data from among a large amount of data stored in memory. According to the video signal recording and/or playback apparatus, when recording video signals a hard disk drive (HDD), video signals captured by, for example, a camera recorder apparatus, and a digital camera apparatus, are categorized into video signals of a category A, and are recorded into the HDD. On the other hand, video signals of television broadcasts are categorized into video signals of a category B, and are recorded into the HDD.

In the case that, of video signals recorded in the hard disk drive, video signals of the category B (=television broadcast video signals) are presented to a user, a microprocessor forms and list-displays thumbnail images of the respective television broadcast video signals. Thereby, the user can retrieve a desired image from among images of recorded television broadcasts in accordance with the thumbnail image.

In the case that, of video signal recorded into the hard disk device, video signals of the category A (video signals captured by the camera recorder apparatus or digital camera apparatus) are presented to the user, the microprocessor displays on the display a calendar image of a month specified by the user. In addition, the microprocessor designates captured dates of the respective video signals in accordance with date information added to respective video signals recorded in the hard disk drive.

Subsequently, icons of the camera recorder apparatus representing respective video signals captured by the camera recorder apparatus and/or icons of the digital camera apparatus representing respective video signals captured by the digital camera apparatus are formed. Then, the icons of the camera recorder apparatus and/or the digital camera apparatus are displayed on display areas corresponding to the captured dates of the respective video signals on the calendar image.

In accordance with these icons displayed on the calendar image, it can be recognized that the video signals captured by the camera recorder apparatus and/or the digital camera apparatus on the corresponding dates are stored in the HDD.

Subsequently, in accordance with the calendar image, the user can recognize existence of some images captured with the dates displayed with the icons; however, the user cannot recognize the contents of the images. As such, when wanting to know the contents of the images, the user specifies a desired date from among the dates displayed with the icons. In response to the specification, the microprocessor forms thumbnail images of typical ones of images captured on the date by the camera recorder apparatus and/or the digital camera apparatus, and displays the thumbnail images) in place of the calendar image on the display. Thereby, the user can recognize the contents of the images captured with the specified date.

In addition, the microprocessor displays on the display, together with the thumbnail images, a previous-date button and a subsequent-date button. The previous-date button is operated to specify displaying of an image captured on the date previous to a date of the image currently being displayed. The subsequent-date button is operated to specify displaying of the image captured on the date subsequent to the date of the image currently being displayed. Upon detection of an operation of the previous-date button, the microprocessor sequentially displays on the display an image captured with a date previous to the date of an image currently being displayed, in units of the detection of the operation. On the other hand, upon detection of an operation of the subsequent-date button, the microprocessor sequentially displays, on the display in units of the detection of the operation, an image captured with the date subsequent to the date of an image currently being displayed.

As described above, according to the video signal recording and/or playback apparatus disclosed in Japanese Unexamined Patent Application Publication No. 2004-297649, video signals to be stored into the HDD by being categorized into video signals captured by the camera recorder apparatus and video signals captured by the digital camera apparatus (category A) and video signals of television broadcasts (category B). In addition, for the video signals of television broadcasts, thumbnail images of the respective video signals are list-displayed, thereby enabling easy retrieval of a desired video signal from among a large number of video signals of television broadcasts.

In addition, for video signals captured by the camera recorder apparatus or video signals captured by the digital camera apparatus, the icons of the apparatuses used to capture the images are displayed on display areas corresponding to dates on the calendar image in accordance with date information added to the respective video signals. Thereby, the existence of video signals that correspond to the dates and that are captured by the camera recorder apparatus and/or the digital camera apparatus is indicated. In this manner, of a large number of images that are captured by the camera recorder apparatus or the digital camera apparatus and that are stored in the HDD, a desired image can be generously retrieved in accordance with the dates displayed with the icons on the calendar image.

Further, in the event that, of dates on the calendar image, a date displayed with the icon is specified, thumbnail images captured with the date are formed and displayed. In addition, an image captured previous to the specified date or an image captured with a date after the specified data is sequentially displayed in units of a user specification. Thereby, the contents of images captured with respective dates can be verified, and a desired image can easily be retrieved from among a large number of recorded images captured by the camera recorder apparatus and the digital camera apparatus.

As described above, according to the conventional mobile phone, with the increase in the amount of data to be stored therein, such as still images, motion images, and music data in proportion to the increase of the memory storage capacity, thumbnail images, captured dates, and/or melody titles are simply arranged in parallel and displayed. As such, a problem exists in that it is difficult to perform high speed browsing of a large amount of data (or, to carry out high speed verification).

With desired meta-information added to respective pieces of the data and storing the data, high speed browsing of the data can be performed to a certain extent in accordance with the meta-information. However, the meta-information has to be input corresponding to each piece of data, such that a problem still exists in that the input operation is very complicate and burdensome.

According to the video signal recording and/or playback apparatus disclosed in Japanese Unexamined Patent Application Publication No. 2004-297649, when browsing images of a television broadcast (images of the category B), thumbnail images of respective images are parallel arranged and displayed. As such, a problem arises in that it is difficult to perform high speed browsing (or, high speed verification) of a large number of images.

Further, according to the video signal recording and/or playback apparatus, when browsing images captured by the camera recorder apparatus or the digital camera apparatus (i.e., images of the category A), only the icon is displayed on the calendar. As such, what is initially recognizable from the icon is only the presence or absence of an image captured on the corresponding date. There arises a problem that the user has to trace his/her memory in accordance with the date, consequently only allowing unclear recognition of the contents. A further problem arises in that each thumbnail image has to be displayed by specifying the date in order to verify the image contents, and the contents have to be verified in that manner. Thus, problems still exist in that it is difficult to accomplish high speed browsing of a large number of images.

SUMMARY OF THE INVENTION

The present invention is made in view of problems such as described above. Accordingly, it is intended to provide a display controller, a display control method, a mobile terminal device, and a display control program that enable high speed browsing of a large amount of data without requiring complicate and burdensome input operation.

According to an embodiment of the present invention, a display controller includes time line display means that includes at least two or more units of time on, of a first display area and a second display area that are formed on display means, the first display area, and that displays a time line manipulable to specify a desired unit of time from the two or more units of time; and related information display means that reads out, from a plurality of pieces of information stored respectively including time information added, information to which are added time information related to a unit of time specified by manipulation of the time line displayed on the first display area through operating means, and that displays the read out information on the second display area of the display means.

According to another embodiment of the present invention, a display control method includes displaying a time line manipulable to specify a desired unit of time from at least two or more units of time on, of a first display area and a second display area that are formed on display means, the first display area; reading out information, to which are added time information related to a unit of time specified by manipulation of the time line displayed on the first display area through operating means, from a plurality of pieces of information stored in the display means to respectively include time information added; and displaying the read out information on the second display area of the display means.

According to another embodiment of the present invention, a mobile terminal device includes storing means for storing a plurality of pieces of information respectively including time information added; display means for displaying the information; time line display means that includes at least two or more units of time on, of a first display area and a second display area that are formed on display means, the first display area, and that displays a time line manipulable to specify a desired unit of time from the two or more units of time; operating means for specifying a unit of time of the time line; and related information display means that reads out from the storing means information to which are added time information related to the unit of time specified by manipulation of the time line displayed on the first display area through operating means, and that displays the read out information on the second display area of the display means.

According to another embodiment of the present invention, a display control program executable on a computer includes the steps of displaying a time line manipulable to specify a desired unit of time from at least two or more units of time on, of a first display area and a second display area that are formed on display means, the first display area; reading out information, to which time information related to a unit of time specified by manipulation of the time line displayed on the first display area through operating means is added, from a plurality of pieces of information stored in the display means to respectively include time information added; and displaying the read out information on the second display area of the display means.

Thus, according to the present invention, the time line display means includes at least two or more units of time on, of a first display area and a second display area that are formed on display means, the first display area, and that displays a time line manipulable to specify a desired unit of time from the two or more units of time.

In the event that the desired unit of time is specified by manipulation of the time line displayed on the first display area through operating means, the related information display means reads out, from a plurality of pieces of information stored respectively including time information added, information to which are added time information related to the specified unit of time, and displays the read out information on the second display area of the display means.

BRIEF DESCRIPTION OF THE DRAWINGS

In the accompanying drawings,

FIGS. 3A to 3G, respectively, are schematic views of display screens descriptive of the relationships between operation buttons and shifting of display screens in a browsing mode of the mobile phone of the embodiment;

DETAILED DESCRIPTION OF THE PREFERRED EMBODIMENTS

The present invention is adaptable to mobile phones. Embodiments of the present invention will be described below with reference to the accompanying drawings.

(Electrical Configuration of Mobile Phone)

Figure 1:
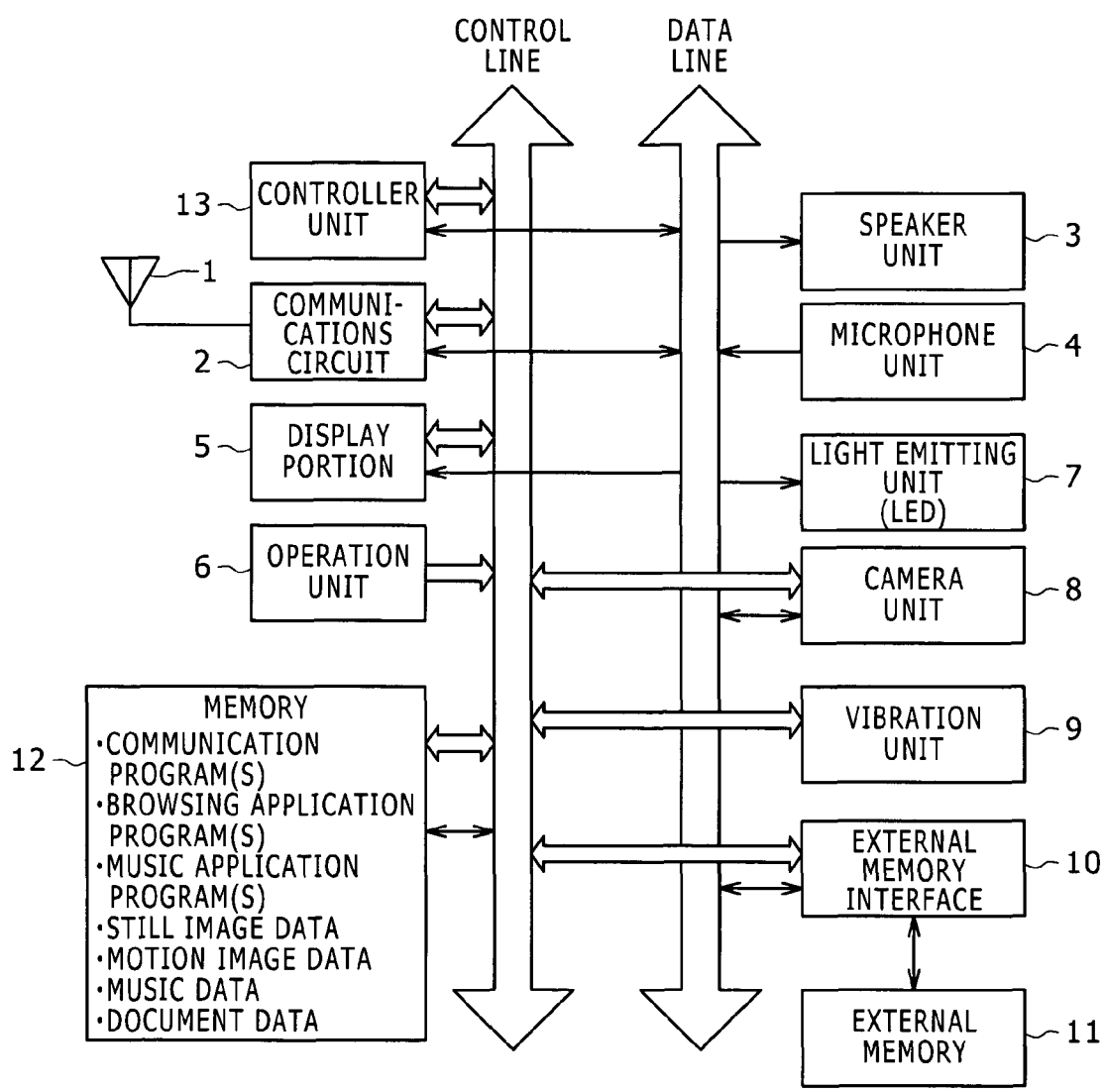
FIG. 1 is a block diagram of a mobile phone of an embodiment to which the present invention is adapted.

FIG. 1 shows a block diagram of a mobile phone of an embodiment utilizing the present invention. With reference to the drawing figure, the mobile phone of the present embodiment includes an antenna 1, a communications circuit 2, a speaker unit 3, a microphone unit 4, and a display portion 5. The antenna 1 and the communications circuit 2 effect data transmission and reception between base stations connected to communications network managed by a mobile communications vendor. The speaker unit 3 receives incoming sounds, receiving audio, audio of motion image files, and audio of music data. The microphone unit 4 captures transmission audio and the like. The display portion 5 displays, for example, outgoing and incoming call telephone numbers, transmission sources, names of users at transmission destinations, outgoing and incoming call logs of, for example, telephone calls and mobile mail communications, address books, schedule books, and texts of transmitted and received mobile mail communications. The display portion 5 further displays below-described browsing screens such as still images.

The mobile phone further includes an operation unit 6, a light emitting unit 7 (LED: light emitting diode), a camera unit 8, and a vibration unit 9. The operation unit 6 has a plurality of keys to be used by a user to enter desired telephone numbers, characters, and the like and to specify displaying of the browsing screen, for example. The light emitting unit 7 is used to display to the user, for example, incoming telephone calls and reception of mobile mail communications through light. The camera unit 8 is used to capture still images and motion images of desired subjects. The vibration unit 9 is used to informing the user of, for example, incoming telephone calls and received mobile mail communications by vibrating a housing 21 of the mobile phone.

The mobile phone further includes an external memory interface 10 (external memory IF), a memory 12, and a controller unit 13. An external memory 11 is coupled to the external memory IF 10. The external memory 11 is a mass storage memory for storing still images and motion images captured by the camera unit 8 and the like and a desired music data, for example. The memory 12 is used to store, for example, communication programs for effecting wireless communication with the base stations, various application programs, data of the telephone directory and schedule book, textual (document) data of mobile mail communications, and still images and motion image captured by the camera unit 8 and the like. The controller unit 13 is used to controlling the overall operation of the mobile phone in accordance with, for example, application programs stored in the memory 12.

The application programs stored in the memory 12 include, for example, a music player application program for playing back music data stored in either the memory 12 or the external memory 11, and a browsing application program for browsing the contents of data stored in either the memory 12 or the external memory 11.

Time information representing the captured date of a still image or motion image is added to the respective still image data and or motion image data stored in either the memory 12 or the external memory 11. Similarly, time information representing a stored date of respective time information is added to respective music data stored in either the memory 12 or the external memory 11.

(Exterior Configuration of Mobile Phone)

Figure 2:
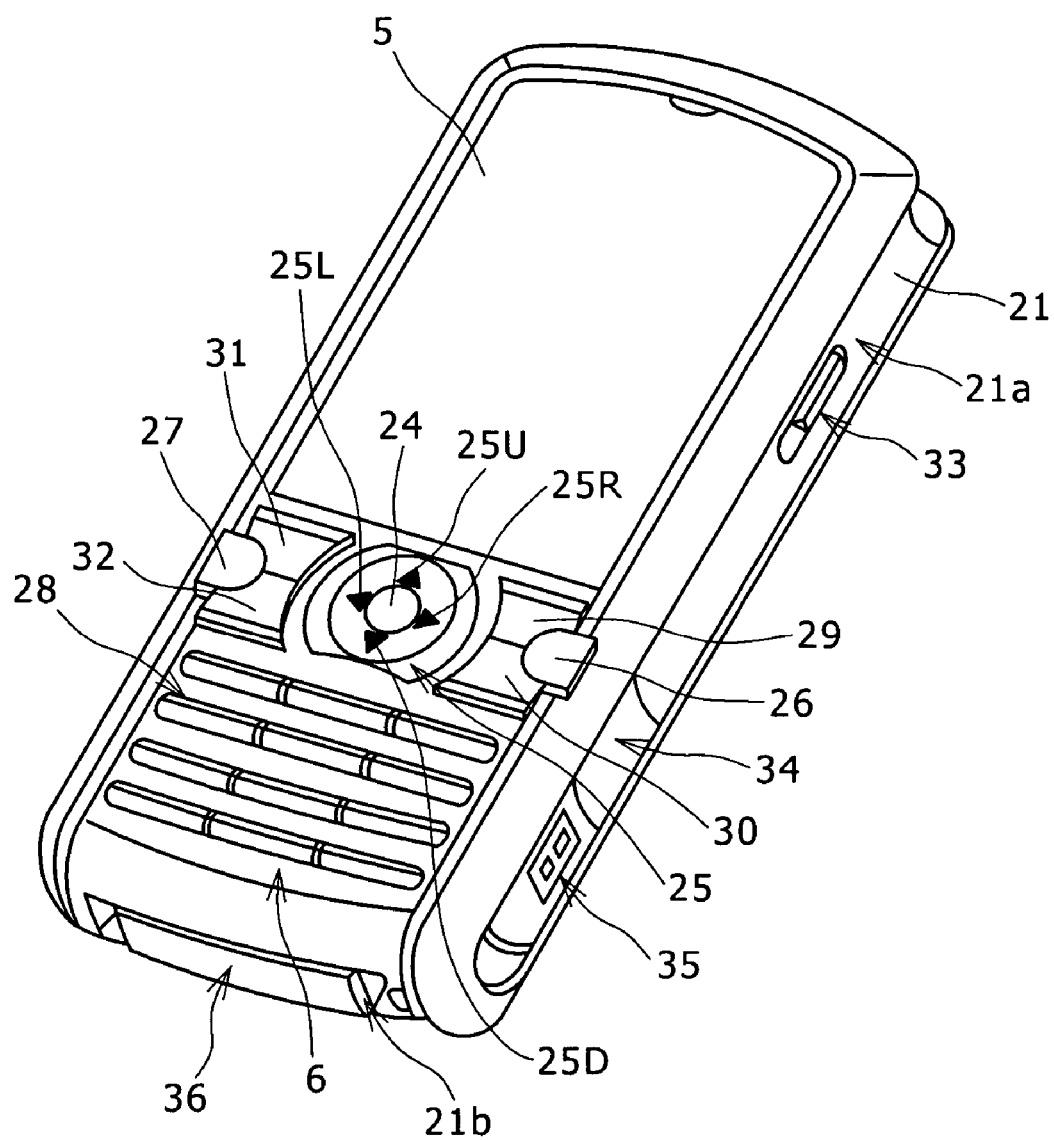
FIG. 2 is a perspective view showing the exterior of the mobile phone of the embodiment.

FIG. 2 shows an exterior view of the mobile phone of the present embodiment. As seen from FIG. 2, the mobile phone is of a so-called straight type (stick type). In the mobile phone of this type, for example, the display portion 5, such as a liquid crystal display portion, is provided in substantially the upper half area on the front side of the housing 21, and the operation unit 6 is provided in substantially the lower half area on the front side of the housing 21.

The operation unit 6 includes an enter key 24, a cross key 25, an on-hook key 26 and an off-hook key 27, and 12 input keys 28. The enter key 24 is positioned in substantially the center of the surface of the housing 21. The cross key 25 is provided in such a manner as to surround the enter key 24. The on-hook key 26 and the off-hook key 27 are provided near two lateral walls of the housing 21 in such a manner as to position the cross key 25 therebetween. The input keys 28 are depressed to input various items, such as telephone numbers and characters, for example.

The cross key 25 includes keys such as an up key 25U, a down key 25D, a left key 25L, and a right key 25R. A focus is shifted, such as described further below, by operation of the respective up key 25U, down key 25D, down key left key 25L, and right key 25R.

The operation unit 6 further includes a web key 29, a my-select key 30, a mail key 31, and a clear key 32. The web key 29 and the my-select key 30 are provided between the cross key 25 and the on-hook key 26 in such a manner that one key is divided into upper and lower portions. Similarly, the mail key 31 and the clear key 32 are provided between the cross key 25 and the off-hook key 27 in such a manner that one key is divided into upper and lower portions.

The web key 29 functions as a shortcut key for displaying web menus in network communication across a network, such as the Internet. The my-select key 30 functions as a shortcut key for displaying desired menus preliminarily registered by users. The mail key 31 functions as a shortcut key for displaying mail menus for, for example, viewing or reading received mailpieces and creating new mailpieces. The clear key 32 is used to erase an input character(s) and return the current operation to a one-previous operation, for example.

A righthand lateral wall portion 21a of the housing 21 of the mobile phone includes an imaging mode shift key 33, an earphone connection terminal 34, and a shutter button 35 of the camera unit 8. The imaging mode shift key 33 is operated to shift the mode of the phone between a standard imaging mode and macro-imaging mode of the camera unit 8 provided in the mobile phone, an earphone connection terminal 34 for connecting an earphone unit, and a shutter button 35 of the camera unit 8.

Further, an electrical charge terminal 36 for connecting an electrical charger is provided in a bottom wall portion 21b of the housing 21. Further, although not shown, a lens unit, a strobe light, and the like of the camera unit 8 and the speaker unit 3 are provided on the reverse side of the housing 21 (reverse side with respect to the front side on which the display portion 5 is provided).

(Operation in Browsing)

(Album Display Mode)

In the mobile phone of the present embodiment configured as described above, data stored in either the memory 12 or the external memory 11 can be quickly browsed (verified (viewed or read)). Description below will proceed with reference being made to an example case where data to be browsed represents still images stored in the either the memory 12 or the external memory 11.

First, when browsing still images stored in the either the memory 12 or the external memory 11, a user operates the enter key 24 of operation unit 6 in an incoming-communication wait mode of the mobile phone. Upon detection of the operation of the enter key 24 in the wait mode, the controller unit 13 performs display control to display various menus on the display portion 5. Subsequently, the user operates the cross key 25 of the operation unit 6 to select a browsing menu from the displayed menus, and then operates the enter key 24. In the state where a browsing menu has been selected, the controller unit 13 shifts to an album display mode. Upon detection of the operation of the enter key 24 in the state where the browsing menu has been selected, the controller unit 13 operates such that the mode shifts to the album display mode in accordance with the browsing application program. Thereby, the controller unit 13 forms thumbnail images of respective still images stored in either the memory 12 or the external memory 11 that has been specified by the user, and performs display control to display the thumbnail images on the display portion 5.

FIG. 3A shows a display example of respective thumbnail images in the album display mode. With reference to the shown example, thumbnail images of nine still images of the respective still images stored in the either the memory 12 or the external memory 11 are formed and displayed on the display portion 5.

When forming the thumbnail images, the controller unit 13 forms at one time thumbnail images of nine captured images each selected in order from a still image (=latest capture image) captured at past time most closest to the current time, and performs display control of the display portion 5 to display them.

In addition, as shown in FIG. 3A, the controller unit 13 arrays the nine thumbnail images into a 3 (horizontal)×3 (vertical) matrix and controls the display portion 5 to display them. Thereby, the first thumbnail image (=the latest captured image) is displayed on the lefthand side of the upper row, the second thumbnail image (image captured at the second latest time) is displayed in the center of the upper row, and the third thumbnail image (image captured at the third latest time) is displayed on the righthand side of the upper row.

In addition, the controller unit 13 operates such that the fourth thumbnail image (=image captured at the fourth latest time) is displayed on the lefthand side of the middle row, the fifth thumbnail image (image captured at the fifth latest time) is displayed in the center of the middle row, and the sixth thumbnail image (image captured at the sixth latest time) is displayed on the righthand side of the middle row.

Further, the controller unit 13 operates such that the seventh thumbnail image (=image captured at the seventh latest time) is displayed on the lefthand side of the lower row, the eighth thumbnail image (image captured at the eighth latest time) is displayed in the center of the lower row, and the ninth thumbnail image (image captured at the ninth latest time) is displayed on the righthand side of the lower row.

In FIG. 3A, the numerals, such as 10, 9, 5, and 4, displayed in the respective thumbnail images represent captured dates. In the display example, numeral 10 denotes a thumbnail image captured on the 10th of a month in which last image capture was carried out. Similarly, numeral 5 denotes a thumbnail image captured on the 5th of the month in which last image capture was carried out.

While displaying such the thumbnail images, the controller unit 13 operates such that an image frame of the thumbnail image of the latest captured image is displayed in a predetermined color and at high luminance (the manner of display hereinbelow will be expressed as "the focus is positioned" or "focused"). The controller unit 13 operates such that the focus is displayed on a thumbnail image currently being displayed; and more specifically, in present example, the focus is positioned over the thumbnail image of the latest captured image.

The focused the thumbnail image is movable by operating the respective up, down, left, and right keys 25U, 25D, 25L, and 25R of the cross key 25. The controller unit 13 controls the focus to shift upon or corresponding to a detection of an operation of the respective up, down, left, right key 25U, 25D, 25L, 25R.

Further, the controller unit 13 performs display control such that a rod-like scroll bar is displayed along the right edge of the display screen together with the respective thumbnail images and the focus. The scroll bar has a total length corresponding to the total number of still images stored in the either the memory 12 or the external memory 11, the upper end portion corresponding to the latest still image, and lower end portion corresponding to the image captured at the earliest time.

The length of a part of the scroll bar in a different display color indicates the number of thumbnail images currently being displayed (nine images in the present example). In addition, in the case that still images are linearly arrayed along a time series direction in above-described state, the part of the scroll bar indicates the position corresponding to the currently displayed thumbnail images of the still images (that is, the currently displayed thumbnail images of the still images correspond to what portions of thumbnail images of still images of all the still images.). In the example shown in FIG. 3A, the thumbnail images of nine captured images out of latest captured images are displayed. Thus, it can be recognized that the part near to the top end portion of the scroll bar is different in the display color (the part in the different display color indicates the range of the nine images.)).

In addition, the controller unit 13 performs display control such that the characters "View" are displayed in a lower left end portion of the display portion 5, and the characters "More" are displayed in a lower right end portion of the display portion 5. As one example, "View" represents that the mail key 31 is allocated with a function of largely displaying on the display portion 5 a still image corresponding to a currently selected thumbnail image in the album display mode. "More" represents that the web key 29 is allocated to a function of displaying, in the album display mode, nine thumbnail images subsequent to currently displayed nine thumbnail images and captured earlier in the past than the currently displayed nine thumbnail images.

In the album display mode, every time the operation of the web key 29 is detected, the controller unit 13 operates such that nine thumbnail images captured in the past are displayed on the display portion 5 in place of currently displayed nine thumbnail images. In addition, a still image corresponding to a focused thumbnail image is read from either the memory 12 or the external memory 11 with timing of detection of the operation of the mail key 31, thereby performing display control to display the image on the display portion 5.

When retrieving a desired image in the album display mode, the user operates the web key 29 to cause the display portion 5 to display thumbnail images in units of nine pieces. In response, the display portion 5 displays thumbnail images of desired still images. Then, the user operates the up, down, left, and right keys 25U, 25D, 25L, and 25R of the cross key 25 so that a desired thumbnail image focused out of the nine thumbnail images is displayed on the display portion 5, and then operates the mail key 31 in that state. Thereby, a still image (desired still image) corresponding to the currently focused thumbnail image is display-controlled by the controller unit 13 to be largely displayed on the display portion 5.

In the present example, when the album display mode has been displayed, nine thumbnail images are, as a default (in principle), displayed sequentially in order from the thumbnail image of the latest captured image. However, nine thumbnail images displayed in the previous execution of the album display mode may be displayed in the next execution of the album display mode.

In the present example, when the album display mode has been executed, the thumbnail image of the latest captured image is focused as a default. However, nine thumbnail images displayed in the previous execution of the album display mode may be displayed in the next execution of the album display mode, and the focus may be remained positioned in the next execution of the album display mode over a thumbnail image focused in the previous execution of the album display mode.

Further, in the present example, whereas, as one example, thumbnail images of nine still images are displayed at one time, the number of thumbnail images may be changed to, for example, six or four, in accordance with design. Alternatively, the manner may be such that the number of thumbnail image to be displayed is selectable.

(Search Mode)

When, for example, retrieving or quickly viewing a desired still image in the album display mode, a user operating the web key 29 and thereby causing the display portion 5 to sequentially display thumbnail images in units of nine pieces. Thereby, the user retrieves the desired still image in accordance with the displayed thumbnail images. However, in the case of a large amount of still images stored in the either the memory 12 or the external memory 11, such the manner of retrieving may take a long time before retrieving the desired still image.

For instance, according to the present example, in the case of 1,000 still images stored in the either the memory 12 or the external memory 11, nine thumbnail images including a thumbnail image of a latest still image (=thumbnail image of the 1000th still image) out of the 1,000 still images are displayed. However, when the user-desired retrieval still image is coincident with the image captured at the earliest time (i.e., the first still image), the web key 29 has to be operated as many as 112 times before retrieval of the thumbnail image of the first still image, consequently requiring a long time before retrieval of the desired still image.

As such, according to the mobile phone of the present embodiment, a time line (time axis) shiftable in the dimensions (ranges), such as the month and date, is displayed together with the thumbnail images on the display portion 5. In addition, the thumbnail images to be displayed are shifted in conjunction with the manipulation of the time line. Thereby, a shortcut path to a large amount of contents (still images in the present example) can be used, and hence quick retrieval of the desired still image can be accomplished.

When performing retrieval using the time line, a user operates the operation unit 6 to select a search menu in the album display mode. Upon detection of the selection operation for selection of the search menu in the album display mode, the controller unit 13 shifts to a search mode and executes a routine shown in FIG. 4.

In more specific, upon having shifted to the search mode, at step S1 the controller unit 13 operates such that a still image corresponding to a thumbnail image focused immediately previously to shifting to the search mode from the album display mode is retrieved from either the memory 12 or the external memory 11. Subsequently, time information added to the still image is read out. Then, in accordance with the time information, the controller unit 13 detects a month in which still images corresponding to the immediately previously focused thumbnail image were captured, and proceeds to step S2.

At step S2, the controller unit 13 operates such that still images captured in the month detected at step S1 are retrieved from either the memory 12 or the external memory 11. Then, in accordance with time information added to the still images, nine still images are selected sequentially in order from latest still images captured in that month.

More specifically, for example, a case is assumed in that, as still images captured in October, one still image captured on October 31, five still images captured on October 25, three still images captured on October 10, and one still image captured on October 1 have been detected. In this case, the controller unit 13 selects the still image captured on October 31 as the latest still image, then sequentially selects the still images captured on October 25, then the still images captured on October 10, and then the still images captured on October 1.

Subsequently, at step S3 the controller unit 13 operates such that still images captured in the month detected at step S1 and in previous and subsequent months to the month detected at step S1 are retrieved from either the memory 12 or the external memory 11. Then, in accordance with time information added to the respective still images, a latest still image captured in the month detected at step S1 and respective latest still images captured in the previous and subsequent months are detected.

In addition, as shown in FIG. 3B, the controller unit 13 operates such that the overall display area of the display portion 5 is divided into a first display area and a second display area. Then, at step S3 the controller unit 13 forms thumbnail images corresponding to the nine still images captured in the month and detected at step S2, and performs display control to display them on the second display area shown in FIG. 3B.

Further, the controller unit 13 forms the time line manipulable to specify units of time (=dimensions (ranges) described above) of at least month and day, and performs display control to display the time line on the first display area.

Further, the controller unit 13 performs display control such that the thumbnail images of the latest still images captured in the month detected at step S1 and the thumbnail images of the latest still images captured in the previous and subsequent months, respectively, are arrayed in order of the month and are displayed on the time line.

Further, the controller unit 13 performs display control such that, of the thumbnail images of the respective months displayed on the time line, thumbnail images corresponding to the month of the nine thumbnail images displayed on the second display area (i.e., thumbnail images corresponding to the month detected at step S1) are focused.

When still images captured in the month detected at step S1 is less than nine, the controller unit 13 performs display control to display the number of captured thumbnail images on the second display area of the display portion 5 and to display gray images (images each fully colored in gray) on remaining display areas for still images. Thereby, the controller unit 13 informs the user that the still images captured in the month detected at step S1 are only those represented by the currently displayed thumbnail images.

In the event that no still images captured in the previous and subsequent months are detected, the controller unit 13 similarly operates such that gray images are displayed on areas of thumbnail images corresponding to the months on the time line, thereby to inform the user that no still images captured in the months are present.

Figure 5:
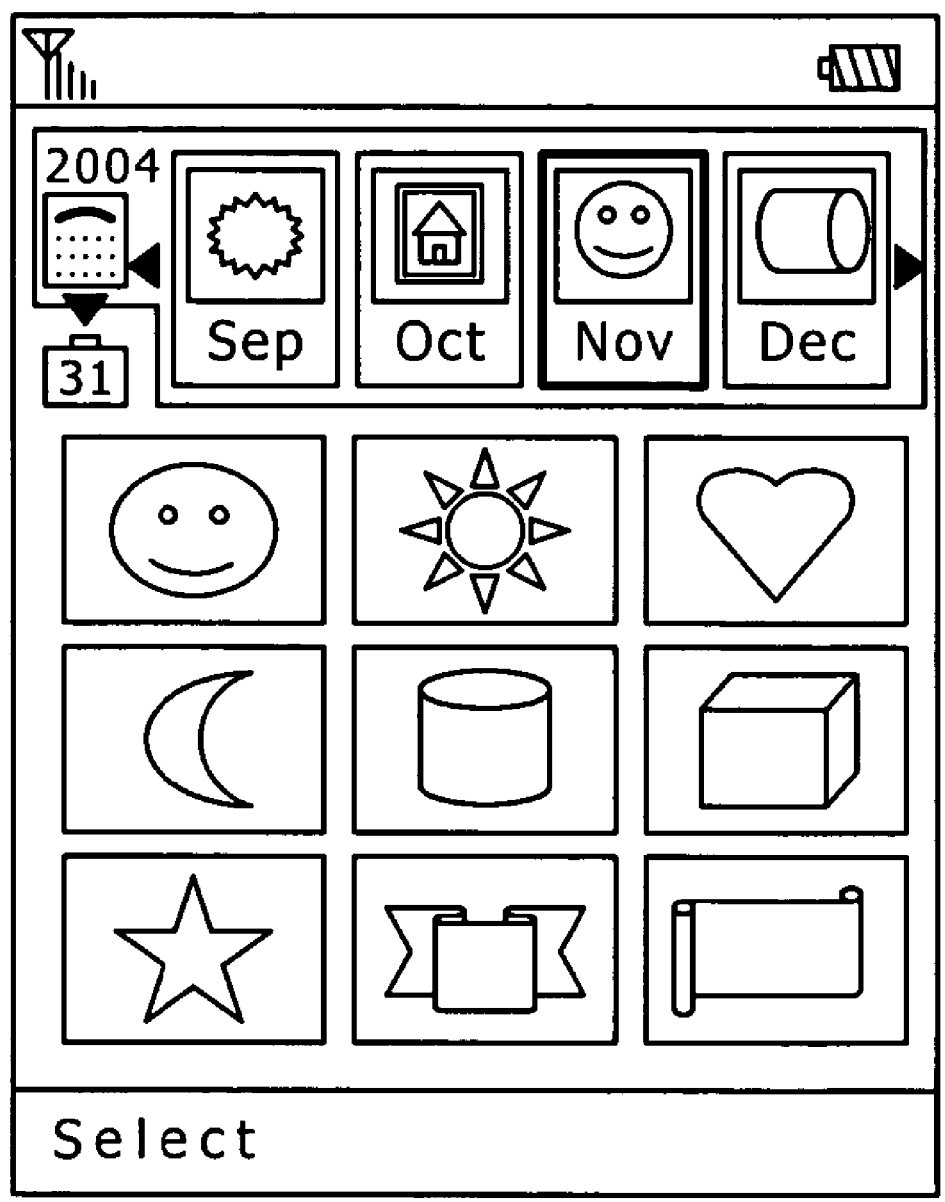
FIG. 5 is a view showing an example of a display screen in the case where a time line displayed in the browsing mode is set to a month dimension (range) in the mobile phone of the embodiment.

FIG. 5 shows a detailed display example of the time line. The example shown therein is displayed in the case that thumbnail images focused immediately previously to shifting from the album display mode to the search mode are captured in November 2004.

In this case, the controller unit 13 operates such that, of the respective still images captured in "Nov" (=November) recognized as a captured month of still images corresponding to a thumbnail image focused immediately previously to shifting to the search mode, a thumbnail image of a latest still image is displayed on the time line, the characters "Nov" representing the captured month, i.e., November, in the form added to the latest still image.

In addition, the controller unit 13 operates such that, from still images captured in the respective months, namely, September, October, and December, which correspond to the previous and subsequent months to November, the respective characters "Sep", "Oct", and "Nov" representing the captured months are displayed on the time line in the forms added to the latest still images of the respective months.

The controller unit 13 performs display control such that, of the thumbnail images of the respective months displayed on the time line, the thumbnail image of November coincident with a captured month of a thumbnail image focused immediately previously to shifting to the search mode is focused.

Further, the controller unit 13 operates such that the nine thumbnail images of the images captured in November, which is the focused month, are displayed on the second display area located below the display area of the time line. In the search mode, the display sequence of the nine thumbnail images to be displayed on the second display area is similar as the display sequence of the thumbnail images in the event of the album display mode. A thumbnail image corresponding to a latest still image is displayed on the lefthand side of the upper row, and other images are displayed sequentially in order of the captured time.

In addition, the controller unit 13 operates such that a right-pointing arrow icon is displayed between a thumbnail image of a month (thumbnail image of December in the present example) displayed at the right end of the time line and the right end of the display area. The controller unit 13 further operates such that a left-pointing arrow icon is displayed between a month (thumbnail image of December, in the present example) displayed at the left end of the time line and the left end of the display area.

The right-pointing arrow icon indicates that, by operation of the right key 25R of the cross key 25, the month to be focused (or, focus month) on the time line shifts up as, for example, "Sep"→"Oct"→"Nov," along the month shift-up direction.

The left-pointing arrow icon indicates that, by operation of the left key 25L of the cross key 25, the focus month on the time line shifts down as, for example, "Nov"→"Oct"→"Sep," along the month shift-down direction opposite to the month shift-up direction.

As described further below, when the focus month is shifted on the time line by operation of the respective left, right key 25L, 25R of the cross key 25, also nine thumbnail images of the respective month displayed on the second display area are shifted and displayed in conjunction with the shift operation of the focus.

Further, the controller unit 13 causes displaying of characters indicating the year to which respective months currently being displayed with thumbnail images on the time line appertain, an icon of a month-indicated calendar, an icon of a block calendar, and an arrow icon in a central position between those icons.

In the example shown in FIG. 5, which is assumed such that the year to which the respective months displayed with the thumbnail images on the time line appertain is 2004, the characters "2004" are displayed on the time line.

The icons of the month-indicated calendar and the block calendar represent the current dimensions (ranges) of the time line. The dimension of the time line is shiftable by operation of the up key 25U or the down key 25D of the cross key 25. The operation of the up key 25U causes the dimension of the time line to shift to the month dimension, and the operation of the down key 25D causes shifting the dimension of the time line to the day dimension.

In the example shown in FIG. 5, the dimension of the time line is the month dimension. Accordingly, latest still images of respective months are displayed on the time line. As described in further detail below, when the dimension of the time line is shifted to the day dimension by the operation of the down key 25D, thumbnail images of the plurality of still images captured in the month selected on the time line set to the month dimension are displayed on the time line.

Figure 4:
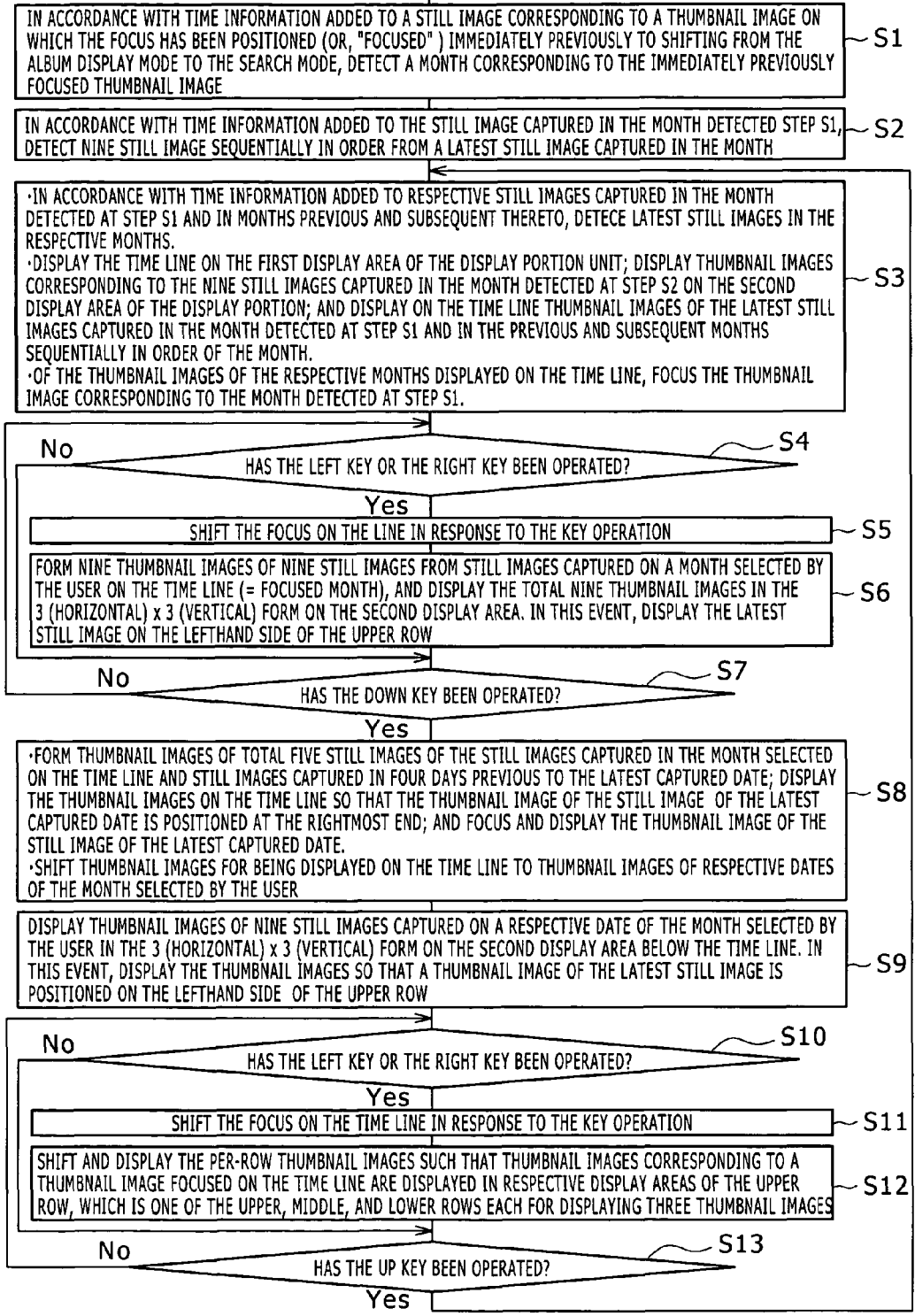
FIG. 4 is a flowchart showing a flow of operation in the browsing mode of the mobile phone of the embodiment.

Subsequently, after the time line is thus displayed on the display portion 5, the controller unit 13 determines at step S4 in the flowchart of FIG. 4 whether either of the left and right keys 25L and 25R has been operated. If having determined that neither of the left and right keys 25L and 25R has been operated, then the processing proceeds to step S7. Alternatively, if having determined that either of the left and right keys 25L and 25R has been operated, then the processing proceeds to step S5.

At step S4 if having detected the operation of the left key 25L, at step S5 the controller unit 13 causes shifting and displaying of the thumbnail images such that, as shown in FIG. 3C, the thumbnail image of the month previous to the currently focused month shifts to the focused position. At step S4 if having detected the operation of the right key 25R, then at step S5 the controller unit 13 causes shifting and displaying of the thumbnail images such that, as shown in FIG. 3E, the thumbnail image of the month subsequent to the currently focused month shifts to the focused position.

For example, suppose that, as shown in FIG. 3B, the thumbnail images currently being focused on the time line appertain to October ("Oct"), and the operation of the left key 25L has been detected in that state. In this case, as shown in FIG. 3C, the controller unit 13 operates such that the thumbnail image of the respective month is displayed in the manner that the all the thumbnail images shift along the right direction with the focused position being unchanged. Thereby, the controller unit 13 shifts the state so as to focus the thumbnail image of September ("Sep"), which is the thumbnail image of the month previous to the currently focused month.

Similarly, suppose that, as shown in FIG. 3B, the thumbnail images currently being focused on the time line appertain to October ("Oct"), and the operation of the right key 25R has been detected in that state. In this case, as shown in FIG. 3E, the controller unit 13 operates such that all the thumbnail images of the respective month are displayed in the manner that all the thumbnail images shift along the left direction with the focused position being unchanged. Thereby, the controller unit 13 shifts the state so as to focus the thumbnail image of November ("Nov"), which is the thumbnail image of the month subsequent to the currently focused month.

Thus, the thumbnail images of the respective month are shifted and displayed in the state where the focused position is fixed in substantially the center of the time line, and the focused position is easily recognizable by the user. Thereby, a month currently being selected by the user can be displayed in the state where the focused position is fixed in substantially the center of the time line, consequently enabling the selected month to easily be recognizable by the user.

In the case that, as shown in FIG. 3E, the right key 25R has been operated in the state where the thumbnail image of November ("Nov") is focused, the controller unit 13 shifts the state such that the thumbnail image of December ("Dec") is focused, however, December is the last month of the year. As such, when having detected the operation of the right key 25R, the controller unit 13 performs shift control of the focus position to shift to the display position of the thumbnail image of December ("Dec") in the state where the display positions of the thumbnail images of the respective months are fixed, as shown in FIG. 3F.

More specifically, the controller unit 13 operates such that until the thumbnail image of either the initial month, January ("Jan"), or December ("Dec") of the year is displayed, all the thumbnail images are shifted in response to the operation of either the left or right key 25L or 25R in the state of the focus position is fixed in substantially the center of the time line. However, in the events that the operation is performed to cause a shift from November ("Nov") to December ("Dec") or that the operation is performed to cause a shift from February ("Feb") to January ("Jan") in the state that the thumbnail image of either the initial month, January ("Jan"), or December ("Dec") of the year is displayed, the focus is shifted and displayed instead of shifting of the thumbnail images of the respective months.

Thereby, in the event that the operation of causing the shift from November ("Nov") to December ("Dec"), as shown in FIG. 3F, the focus displayed on the time line is shifted onto the thumbnail image (thumbnail image of December ("Dec")) positioned at the right end among the currently displayed thumbnail images of the respective months. Consequently, the user can recognize that the thumbnail image of the last month of the year on the time line has been selected.

Similarly, in the event that the operation of causing a shift from February ("Feb") to January ("Jan"), as shown in FIG. 3G, the focus displayed on the time line is shifted onto the thumbnail image (thumbnail image of January ("Jan")) positioned at the left end among the currently displayed thumbnail images of the respective months. Consequently, the user can recognize that the thumbnail image of the initial month of the year on the time line has been selected.

Subsequently, when, as described above, the thumbnail image of December ("Dec") is selected, the focus itself is controlled to be shifted and display in the display position of the thumbnail image of December (Dec). In this state, when the right key 25R is operated, the controller unit 13 performs display control such that a thumbnail image of the subsequent year to the year to which December appertains is displayed on the time line, and the thumbnail image of January is focused.

More specifically, FIG. 3F shows the state where the time line is set to the month dimension of "2004", and the thumbnail image of December 2004 is focused. In this state, upon detection of the operation of the right key 25R, the controller unit 13 detects still images captured in the year 2005 from either the memory 12 or the external memory 11, and forms thumbnail images of latest still images of the respective months. Then, as shown in FIG. 3G, thumbnail images of the respective months January ("Jan") to April ("Apr") are aligned and displayed on the time line, and the thumbnail image of the initial month, January ("Jan"), of the year 2005 is focused and displayed.

Similarly, as shown in FIG. 3G, and when having detected the operation of the left key 25L in the state where the thumbnail image of January 2005 is focused, the controller unit 13 detects still images captured in 2004 from either the memory 12 or the external memory 11, and forms thumbnail images of latest still images of the respective months. Then, as shown in FIG. 3F, thumbnail images of the respective months September ("Sep") to December ("Dec") are aligned and displayed on the time line, and the thumbnail image of the last month December ("Dec") of the year 2004 is focused and displayed.

Thus, according to the mobile phone of the present embodiment, in the case of the time line in the month dimension, also the year can be shifted by operating the left or right key 25L or 25R.

In the case of the time line thus set to the month dimension, in the event that, of still images captured in the respective month, while thumbnail images of still images of latest captured dates are displayed on the time line, no still images captured in the respective month are present, then the gray image is displayed as a thumbnail image of the month. However, when shifting the focus thumbnail image, the controller unit 13 skips over the month displayed as the gray image and thereby shifts the focus thumbnail image.

For example, with reference to the example shown in FIG. 3B, normally, in the event that the operation of the left key 25L has been detected in the state where the thumbnail image of October ("Oct") on the time line is focused when a thumbnail image of September ("Sep") is present, the display control is performed to focus the thumbnail image of September ("Sep").

However, suppose that no thumbnail image of September ("Sep") is present, but the thumbnail image of September ("Sep") is formed as the gray image, and a thumbnail image is displayed in the position of August ("Aug"), the controller unit 13 performs display control such that in the state where the thumbnail image of October ("Oct") on the time line is focused. In this case, the gray image of September ("Sep") is skipped, and the thumbnail image of August ("Aug") is focused with the timing of the operation for detection of the left key 25L. Thereby, browsing can be performed by skipping over a month(s) with no still image being present, consequently enabling even higher speed browsing of all the still images stored in either the memory 12 or the external memory 11.

Subsequently, after the shift display control performed of the thumbnail images of the respective months on the time line in response to the operation of the left or right key 25L or 25R, at step S6 the controller unit 13 retrieves from either the memory 12 or the external memory 11 still images captured in a month (focused month) selected by the user on the time line, and forms nine thumbnail images of the still images. Then, of the nine thumbnail images, a thumbnail image of a latest still image is displayed on the lefthand side of the upper row of the second display area, and the remaining eight images are arrayed in accordance with the captured dates (and times). Thereby, total nine thumbnail images are displayed into the 3 (horizontal)×3 (vertical) state.

That is, FIG. 3C shows the state where thumbnail images of the September period on the time line are selected by the operation of the left key 25L. In this case, a thumbnail image of a still image captured on September 29, which is the latest still image of the month, is displayed on the lefthand side on the upper row, and respective thumbnail images are displayed in order of three thumbnail images of still images captured on September 25, one thumbnail image of a still image captured on September 15, two thumbnail images of still images captured on September 7, . . . .

Similarly, FIG. 3E shows the state where thumbnail images of the November period on the time line are selected by the operation of the right key 25R. In this case, of four thumbnail images of still images captured on October 21, a thumbnail image with a latest captured time is displayed on the lefthand side of the upper row, and other thumbnail images are displayed in order of two thumbnail images of still images captured on October 5 and three thumbnail images of still images captured on October 3.

Thus, thumbnail images being displayed on the time line are each a thumbnail image of the latest still image captured in the corresponding month. In addition, in the case that nine thumbnail images are displayed in the second display area below the time line, the latest still image captured in the corresponding month is displayed on the lefthand side of the upper row. Accordingly, the thumbnail image displayed on the lefthand side of the upper row of the second display area is identical to the thumbnail image displayed on the time line.

As partly described above, in the case that a plurality of still images of the same captured date are present, the controller unit 13 compares the still images of the same captured dates with one another, and causes displaying of thumbnail images thereof sequentially with one of them that corresponds to the latest captured time being positioned atop. A case is now assumed in which, for example, three still images of the same captured date are present, in which the captured time of a first one of the still images is 10.30 a.m., the captured time of a second one of the still images is 3.00 p.m., and the captured time of a third one of the still images is 5.30 p.m. In this case, the controller unit 13 causes displaying of thumbnail images of the respective still images of the same captured date in order of a thumbnail image of the still images captured at 5.30 p.m., a thumbnail image of the still image captured at 3.00 p.m., and a thumbnail image of the still images captured at 10.30 a.m.

Subsequently, at step S7 of the flowchart in FIG. 4, the controller unit 13 determines whether the down key 25D of the cross key 25 has been operated. If not having detected the operation of the down key 25D, the controller unit 13 returns the processing to step S4, at which the processing performs shift display control of thumbnail images of time line in the month dimension in response to the operation of the left or right key 25L or 25R.

Alternatively, at step S7 if having detected the operation of the down key 25D, at step S8 the controller unit 13 performs shift control to shift the time line currently in the month dimension to the day dimension.

More particularly, in the state of the time line in the month dimension, if having detected the operation of the down key 25D, at step S8 the controller unit 13 operates such that still images captured in a month selected on the time line in the month dimension are retrieved from the either the memory 12 or the external memory 11; the controller unit 13 operates such that thumbnail images of total five still images of the still images captured in the month selected by the user are formed, which still images are a still image of a latest captured date and still images captured in four days previous to the latest captured date; the thumbnail images are displayed on the time line so that the thumbnail image of the still image of the latest captured date is positioned at the rightmost end; and of the thumbnail image of the respective dates displayed on the time line, the thumbnail image of the still image of the latest captured date is focused and displayed.

Further, in the state of the time line in the month dimension, upon detection of the operation of the down key 25D, the controller unit 13 operates such that the above-described thumbnail images being displayed on the time line shift to thumbnail images of the respective dates of the month selected by the user; and at step S9, still images captured in the respective dates of the month selected by the user are selected from the either the memory 12 or the external memory 11, and as described above, thumbnail images of nine still images are formed. Then, the nine thumbnail images are displayed on the second display area below the time line so that the thumbnail image of the latest still image is displayed on the lefthand side of the upper row, thereby displaying the total nine thumbnail images into the 3 (horizontal)×3 (vertical) state on the second display area below the time line.

FIG. 3D shows the state where the dimension of the time line is set to the day dimension. According to the example shown in FIG. 3D, in the state of the time line in the month dimension, November ("Nov") is selected by a user, and the captured date of the latest still image is November 23. In this case, the controller unit 13 operates such that the current dimension of the time line is indicated as the day dimension, and the characters "Nov" indicating the month selected by the user is November is displayed in the left end portion of the time line. In addition, a thumbnail image of a still image captured on November 23, which is the still image of the latest captured date in the present case, is displayed in the right end portion of the time line. Further, respective thumbnail images of November 22, November 21, November 20, and November 19 are displayed in the direction from the right end portion to the left end portion of the time line.

In addition, on the display area below the display area of the time line, the thumbnail image of November 23 formed from the still image of the latest captured date of November is positioned and displayed on the lefthand side of the upper row, and remaining eight thumbnail images are displayed in accordance with the captured dates thereof.

In the example shown in FIG. 3D, there are present four still images captured on November 23, two still images captured on November 5, and three still images captured on November 3. In this case, the controller unit 13 operates such that, of the four still images captured on November 23, a still image of the latest captured time is positioned and displayed on the lefthand side of the upper row, and thumbnail images of the remaining three still images are subsequently arrayed and displayed in order of later captured dates.

Thus, in the example shown in FIG. 3D, four still images captured on November 23 are present. As in this case, in the case that a plurality of still images of the same captured date are present, the controller unit 13 operates such that, of the still images of the same captured date, the thumbnail image of the still image captured on the latest captured time is displayed on the time line. In the case that, for example, still images captured at 10.00 a.m. and 1.00 p.m. are present, a thumbnail image of the still image captured at 1.00 p.m. is displayed on the time line.

In the example shown in FIG. 3D, the captured date previous to November 23 is November 5. As respective thumbnail images captured in the period from November 19 to November 23 and displayed on the time line, only the thumbnail images of the images captured on November 23 are present. In this case, the controller unit 13 operates such that the thumbnail images of the images captured on the November 23 are displayed on the time line, and four thumbnail images of November 19 to 22 are displayed as gray images (images each fully colored in gray), thereby to inform the user that still images captured on the days are not present.

Subsequently, after the dimension of the time line is thus shifted to the day dimension, the controller unit 13 determines at step S10 shown in the flowchart of FIG. 4 whether either of the left and right keys 25L and 25R has been operated. If it is determined that neither of the left and right keys 25L and 25R has been operated, then the processing proceeds to step S13. If it is determined that either of the left and right keys 25L and 25R has been operated, then the processing proceeds to step S11.

When having proceeded the processing to step S11 after detection of the operation of the left or right key 25L or 25R, the controller unit 13 performs shift display control to shift the focus displayed on the time line along the left or right direction.

Figure 6:
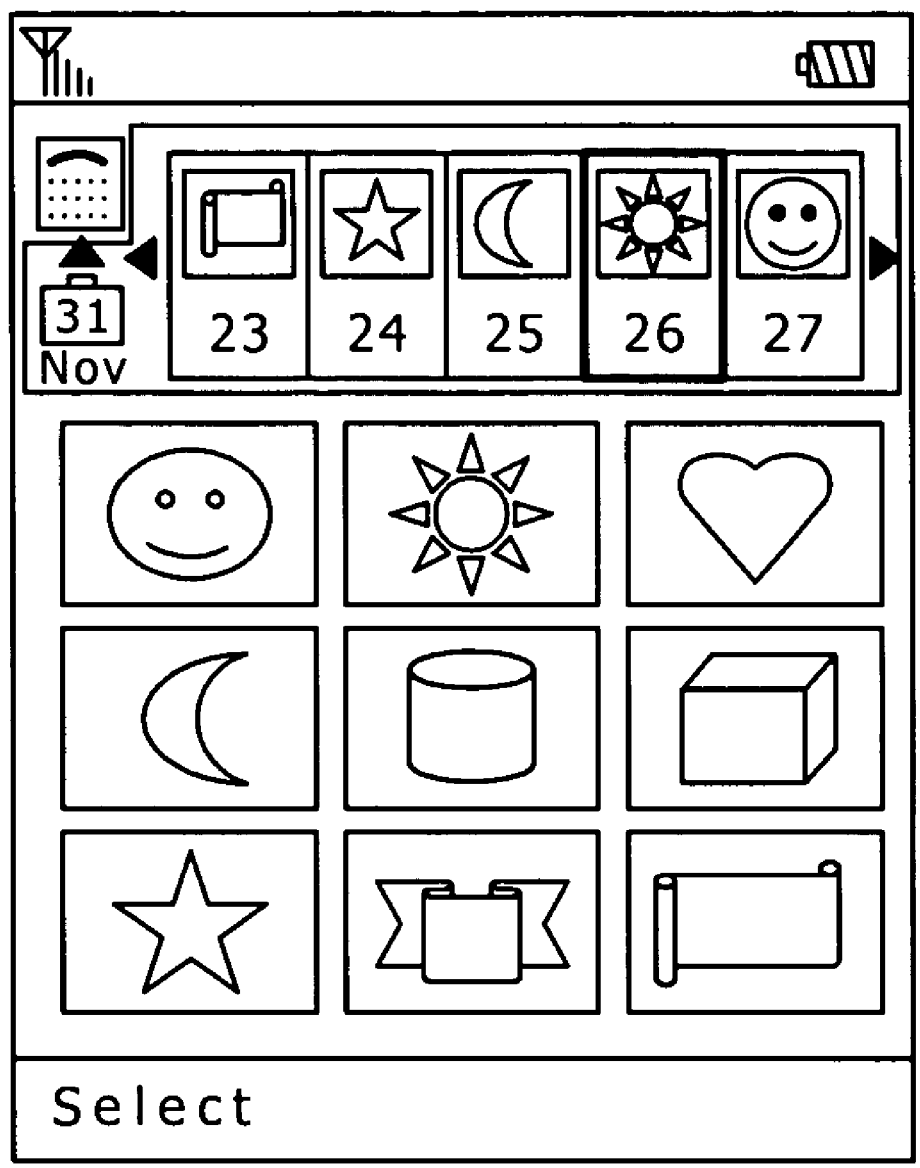
FIG. 6 is a view showing an example of a display screen in the case where a time line displayed in the browsing mode is set to a day dimension (range) in the mobile phone of the embodiment.

A practical example will be described here with reference to FIG. 6. FIG. 6 is a detailed display example in the case of the time line set to the day dimension. When the dimension of the time line has shifted to the day dimension from the state of FIG. 6, as shown, the characters "November" indicating the month being selected are displayed blow the icon of the block calendar.

In the example shown in FIG. 6, upon detection of the operation of the right key 25R in the state where a thumbnail image of November 25 on the time line is focused, the controller unit 13 performs shift display control to shift the focus over thumbnail images in order of the thumbnail image of November 26→the thumbnail image of November 27 . . . in units of one detection of the operation of the right key 25R. Similarly, in the example shown in FIG. 6, upon detection of the operation of the left key 25L in the state where the thumbnail image of November 25 on the time line is focused, the controller unit 13 performs shift display control to shift the focus over thumbnail images in order of the thumbnail image of November 24→the thumbnail image of November 23 . . . in units of one detection of the operation of the left key 25L.

In the case of the time line in the day dimension, in the event that, of still images captured on the respective day, while thumbnail images of still images of latest captured dates are displayed on the time line, no still images captured on the day are present, the gray image is displayed as a thumbnail image of the date. However, when shifting the focus thumbnail image, the controller unit 13 skips over the date displayed as the gray image and thereby shifts the focus thumbnail image.

For example, with reference to the example shown in FIG. 3D, normally, in the event that the operation of the left key 25L has been detected in the state where the thumbnail image of November 23 on the time line is focused when a thumbnail image of the 22 is present, the display control is performed to focus the thumbnail image of the 22.

However, suppose that no thumbnail image of November 20 to 22 is present, but the gray images are formed in the positions of thumbnail images of November 20 to 22, and a thumbnail image is displayed in the position of the 19. In this case, the controller unit 13 performs display control such that in the state where the thumbnail image of November 23 on the time line is focused, the gray images corresponding to the thumbnail images of November 20 to 22 are skipped and the thumbnail image of November 19 is focused with the timing of the operation for detection of the left key 25L.

Thereby, browsing can be performed by skipping over a date(s) with no still image being present, consequently enabling even higher speed browsing of all the still images stored in either the memory 12 or the external memory 11.

Subsequently, in the state of the time line in the day dimension, when having detected the operation of the respective left, right key 25L, 25R, the controller unit 13 performs the above-described shift display control. Then, at step S12 of the flowchart in FIG. 4, the controller unit 13 causes shifting of per-row thumbnail images and performs display control such that thumbnail images corresponding to a thumbnail image focused on the time line are displayed in respective display areas of the upper row among the respective display areas of the upper, middle, and lower rows of the second display area displaying the nine thumbnail images.

More specifically, for example, in the example shown in FIG. 3D, in the case that the focus is controlled to shift onto the thumbnail image of November 3 on the time line, the controller unit 13 operates such that, as shown in FIG. 3D, the row is shifted up so that the thumbnail images displayed on the lower row are positioned onto the upper row currently displaying the thumbnail images of November 23.

Thus, shifting is performed on the respective row basis without causing shifting of the display positions of the thumbnail images on the respective rows. Thereby, the display control can be performed so that thumbnail images of a captured date selected on the time line are all time positioned on the upper row among the upper, middle, and lower rows of the second display area.

Subsequently, in the event that, after the shift display control of the thumbnail images, at step S10 if the controller unit 13 has not detected the operation of the left or right key 25L or 25R, at step S13 of the flowchart in FIG. 4, the controller unit 13 determines whether the up key 25U of the cross key 25 has been operated. If not having detected the operation of the up key 25U, then the controller unit 13 returns the processing to step S10, and again executes the presence or absence of the operation of the left or right key 25L or 25R.

Alternatively, if having detected the operation of the up key 25U, then the controller unit 13 returns the processing to step S3, and thereby returns the dimension of the time line from the current day dimension to the month dimension. More particularly, when the up key 25U is operated in the state of the time line set to the day dimension as shown in FIG. 3D, then as shown in FIG. 3E, at step S3 the controller unit 13 forms a thumbnail image of a month to which the captured date of the thumbnail image on the time line appertains and thumbnail images previous and/or subsequent to that month. Then, the controller unit 13 performs display control such that the thumbnail images are displayed on the time line in the state where the month to which the captured date of the thumbnail image focused on the time line appertains is focused. In addition, the controller unit 13 forms thumbnail images of still images captured in the month to which the captured date of the thumbnail image on the time line appertains, and performs display control to display the thumbnail images on the second display area below the time line. Thereby, the display mode of the display portion 5 is returned from the display mode in the day dimension of the time line to the display mode in the month dimension of the time line.

In this manner, the user operates the up or down key 25U or 25D of the cross key 25 in the search mode to thereby shift the dimension of the time line either from the month dimension to the day dimension or from the day dimension to the month dimension. Further, at the shifted dimension, the user operates the left and right keys 25L and 25R to thereby shift a thumbnail image desired to be focused on the time line, whereby thumbnail images corresponding to desired still images are selected.

By the manipulations of the time line, nine thumbnail images correlated to a thumbnail image focused on the time line are displayed in association with the manipulation of the time line on the second display areas as thumbnail images formed somewhat larger than the thumbnail image displayed on the time line.

The user thus manipulates the time line to thereby search for a desired thumbnail image and verifies a thumbnail image corresponding to the desired still image from among nine thumbnail images somewhat largely displayed on the second display area in association with the manipulation of the time line. Thereby, a large number of still images can be browsed with high speed, hence enabling high speed retrieval of a desired still image.

Further, thumbnail images of respective still images are displayed on the time line and the second display area below the display area of the time line, and a user retrieves a desired still image in accordance with the thumbnail images. Consequently, the user can retrieve the desired still while directly verifying the desired still image through the user's eyes in accordance with the respective thumbnail images. As such, since the retrieval of the still image stored in the either the memory 12 or the external memory 11 is facilitated, a burdensome or complicate operation for inputting and adding the meta-information can be avoided.

Subsequently, as shown in FIGS. 3B to 3G, 5, and 6, in the search mode, the controller unit 13 operates such that characters "Select" are displayed in a lower left display area of the display portion 5. In the search mode, the characters "Select" represent that the function of returning the search mode to the album display mode is allocated to the mail key 31 shown in FIG. 2.

As such, in the search mode, the controller unit 13 all time monitors the operation state of the mail key 31, and returns the search mode to the album display mode shown in FIG. 3A with detection timing of the operation of the mail key 31. In this event, the controller unit 13 operates such that respective thumbnail images in the album display mode so that a thumbnail image selected by a user (i.e., thumbnail image focused on the time line in the search mode) is positioned on the display area on the upper row among the respective thumbnail-image display areas on the upper, middle, and lower rows. Thereby, the thumbnail image of the desired still image retrieved in the search mode can be largely display on the display portion 5 in the album display mode.

More specifically, when largely displaying a desired still image on the display portion 5, the user retrieves and selects a thumbnail image of the desired still image in the search mode, and operates the mail key 31 in the state where the thumbnail image of the desired still image is selected. Thereby, the thumbnail image selected by the user in the search mode is displayed on the display position on the upper row in the album display mode.

In the album display mode, as described with reference to FIG. 3A, the focus for the selection of the desired thumbnail image is displayed, and the user shifts the focus through the cross key 25 and then operates the mail key 31. In the album display mode, the function of largely displaying the still image corresponding to the focused thumbnail image on the display portion 5 is allocated to the mail key 31. As such, the controller unit 13 operates such that the still image corresponding to the focused thumbnail image is largely displayed on the display portion 5 with the detection timing of the operation of the mail key 31. Thereby, the desired still image retrieved in the search mode can be largely displayed on the display portion 5.

Clearly from the above description, the mobile phone of the present embodiment operates such that, in the search mode, nine thumbnail images, for example, displayed in the album display mode are display in the second display area, and the time axis (time line) is displayed on the first display area above the second display area. The dimension (range) of the time line is shiftable between the month dimension and the day dimension, and the user shifts the dimension of the time line to a desired one of the dimensions by operating the up or down key 25U or 25D of the cross key 25. In the case of the time line set to the month dimension, the icon of the month-displaying calendar shown in FIG. 5, for example, is displayed. In addition, in the case of the time line in the day dimension, the icon of the block calendar shown in FIG. 6, for example, is displayed. Thereby, the current dimension can be rendered easily recognizable by the user.

Thumbnail images corresponding to the respective dimension are displayed on the time line. For instance, in the case of the time line set to the month dimension, thumbnail images of still images of the latest captured dates of the respective months are aligned and displayed. Alternatively, for instance, in the case of the time line in the day dimension, thumbnail images of respective still images captured in a month selected by the user in the case of the time line set to the month dimension are aligned and displayed sequentially in order from the latest captured date.

In the shifted dimension, the user operates the left and right keys 25L and 25R of the cross key 25 and thereby performs shift operation of a thumbnail image for being focused on the time line, thereby to select a thumbnail image corresponding to a desired still image. In conjunction with the shift operation of the thumbnail image to be focuses, also nine thumbnail images to be displayed on the second display area are shifted and displayed.

As such, the user manipulates the time line to thereby search for a desired thumbnail image and verifies a thumbnail image corresponding to the desired still image from among nine thumbnail images somewhat largely displayed on the second display area in association with the manipulation of the time line. Thereby, a large number of still images can be browsed with high speed, hence enabling high speed retrieval of a desired still image.

Further, thumbnail images of respective still images are displayed on the time line on the first and second display area, and the user retrieves a desired still image in accordance with the thumbnail images. As such, the user can retrieve the desired still while directly verifying the desired still image through the user's eyes in accordance with the respective thumbnail images. As such, since the retrieval of the still image stored in the either the memory 12 or the external memory 11 is facilitated, a burdensome or complicate operation for inputting and adding the meta-information can be avoided.

In the case of the time line in the month or day dimension, the gray image, for example, is displayed instead of a thumbnail image for the month or day with no thumbnail image being present. However, when shifting the focus thumbnail image, the month or day with no still image being present is skipped, thereby to shift the focus thumbnail image. Consequently, browsing can be performed by skipping over a month(s) or date(s) with no still image being present, therefore enabling even higher speed browsing of all the still images stored in either the memory 12 or the external memory 11.

(Modifications)

According to the embodiment described above, the present invention is adapted to the mobile phone. However, the present invention may be adapted to mobile terminals such as PHS phones (PHS: Personal Handyphone System), PDA apparatuses (PDA: Personal Digital Assistant), notebook personal computers, and other terminal devices such as desktop personal computers.

Further, according to the embodiment described above, browsing of still images is possible. However, not only browsing of the still images, but also browsing of, for example, motion image and music data is possible, and browsing of textual data is enabled by creation of indexes. Even in the cases of adaptation of the present invention to browsing of such other types of data, effects and advantages similar to those described above can be obtained. As one example of the event of browsing of motion images, thumbnail image of a first frame may be formed and displayed on a time line or the like.

While the time line is shiftable between the month dimension and the day dimension, it may be rendered shiftable between, for example, a year dimension and a week dimension.

The latest thumbnail image appertaining to the corresponding month or date is displayed on the time line; however, in the case where a plurality of still images captured in the corresponding month or date are present, the plurality of still images may each be displayed on the time line by being toggled corresponding to the time or the like.

Nine thumbnail images displayed on the second display area are manipulable in conjunction with the manipulation of the time line. Conversely, however, the time line may be rendered manipulable in conjunction with the manipulation of nine thumbnail images displayed on the second display area.

According to the present embodiment, the unit of time of the time line can be specified to a desired unit of time, whereby information related to a unit of time specified to the time line can be displayed on the second display area in conjunction with the specification of operation of the unit of time of the time line. As such, browsing of respective pieces of information stored in the storing means is performed while appropriately shifting the units of time of the time line, thereby enabling high speed browsing of a large amount of information.

Further, according to the present embodiment, when the focus (selector) is shifted to the display position where the display indicative of the absence of the information of the respective pieces of information displayed on the time line is performed, the focus is automatically shifted from the display position to a position where information is subsequently displayed, whereby the selector can be shifted among pieces of present information. Consequently, even higher speed browsing of the information can be accomplished.

The embodiment described above is just one example of the present invention. The present invention is not limited to the embodiment described above, but of course, even embodiments other than the above-described embodiment may be made with various modifications without departing technical spirit and scope of the present invention.

What is claimed is:

1. A display controller comprising:
a control unit configured to control a display;
an operating unit configured to receive input commands;
an electronic memory configured to store information including a plurality of images; and
an electronic display configured to simultaneously display a first display area and a second display area on a display screen, said first display area including a time axis responsive to an input to select a unit of time and a single thumbnail image corresponding to each unit of time on the time axis, and said second display area including a plurality of images received from the electronic memory corresponding to the selected unit of time in the time axis of the first display area, wherein said unit of time on the time axis includes a series of days, weeks, months or years, the single thumbnail image is the latest thumbnail image of the plurality of images corresponding to the selected unit of time on the time axis, and said second display area is configured to display only the plurality of images corresponding to the single thumbnail image corresponding to the selected unit of time on the time axis.

2. The display controller as defined in claim 1, wherein said operating unit includes up, down, left, and right keys, and the up key, being responsive to an input, is configured to increase the units of time displayed on the time axis, and the down key, being responsive to an input, is configured to decrease the units of time displayed on the time axis.

3. The display controller as defined in claim 2, wherein the right key, being responsive to an input, is configured to advance the units of time displayed on the time axis in a forward direction, and the left key, being responsive to an input, is configured to advance the units of time displayed on the time axis in a backward direction.

4. The display controller as defined in claim 1, wherein said first display area displaying the time axis does not display a thumbnail image when there is no information in the electronic memory corresponding to the selected unit of time.

5. The display controller as defined in claim 4, wherein the second display area is configured to automatically display a plurality of images corresponding to the next time axis position, when there is no information in the electronic memory corresponding to the selected unit of time on the time axis.

6. The display controller as defined in claim 1, wherein:
the information stored in the electronic memory is still image information or motion image information; and
the second display area displays still image information or motion image information corresponding to the still image information or motion image information selected by the user in the time axis, and displays the received information as thumbnail images.

7. The display controller as defined in claim 1, wherein the plurality of images displayed in said second display area are displayed in accordance with captured times of the plurality of images.

8. A display control method comprising:
retrieving information from an electronic memory;
displaying, on an electronic display, a first display area that includes
a time axis responsive to an input to select a unit of time, and
a single thumbnail image corresponding to each unit of time being displayed;
identifying an input to select the unit of time displayed on the time axis;
displaying simultaneously on the electronic display, a second display area that includes only a plurality of images corresponding to the single thumbnail image corresponding to the selected unit of time on the time axis, wherein
the single thumbnail is the latest thumbnail image of the plurality of images, displayed in the second display area, corresponding to the selected unit of time.

9. The display control method as defined in claim 8, wherein
the displaying of the plurality of images in said second display area includes displaying the plurality of images in accordance with captured times of the plurality of images.

10. A mobile terminal device comprising:
means for controlling a display means;
means for storing a plurality of information including images and time information;
means for receiving input commands;
means for simultaneously displaying a first display area and a second display area on a display screen, said first display area including a time axis responsive to an input to select a unit of time and a single thumbnail image corresponding to each unit of time on the time axis, and said second display area including a plurality of images received from the storage means corresponding to the selected unit of time in the time axis of the first display area, wherein
said unit of time on the time axis includes a series of days, weeks, months or years,
the single thumbnail image is the latest thumbnail image of the plurality of images corresponding to the selected unit of time on the time axis, and
said second display area displays only a plurality of images corresponding to the single thumbnail image corresponding to the selected unit of time on the time axis.

11. The mobile terminal device as defined in claim 10, wherein
the plurality of images displayed in said second display area are displayed in accordance with captured times of the plurality of images.

12. A computer readable storage medium including computer program instructions for causing a display controller to perform a method, comprising:
retrieving information from an electronic memory;
displaying, on an electronic display, a first display area that includes
a time axis responsive to an input to select a unit of time, and
a single thumbnail image corresponding to each unit of time being displayed;
identifying an input to select a unit of time displayed on the time axis;
displaying simultaneously on the electronic display, a second display area that includes only a plurality of images corresponding to the single thumbnail image corresponding to the selected unit of time on the time axis, wherein
the single thumbnail is the latest thumbnail image of the plurality of images, displayed in the second display area, corresponding to the selected unit of time.

13. The computer readable storage medium as defined in claim 12, wherein
the displaying of the plurality of images in said second display area includes displaying the plurality of images in accordance with captured times of the plurality of images.

* * * * *